United States Patent [19]

Carlson et al.

[11] 4,379,055
[45] Apr. 5, 1983

[54] APPARATUS FOR THE DRIP DRY CONVEYANCE OF OIL-FRIED DOUGH PRODUCTS

[75] Inventors: John L. Carlson; Roger F. Parson; David F. Nicholson, all of Duluth, Minn.

[73] Assignee: Jeno's, Inc., Duluth, Minn.

[21] Appl. No.: 331,079

[22] Filed: Dec. 15, 1981

Related U.S. Application Data

[63] Continuation-in-part of Ser. No. 180,197, Aug. 22, 1980.

[51] Int. Cl.³ .............................................. B01D 33/04
[52] U.S. Cl. ..................................... 210/400; 99/404; 99/644
[58] Field of Search ................. 99/404, 443 C, 484, 99/644; 210/400, 401, 407; 426/438, 400

[56] References Cited

U.S. PATENT DOCUMENTS

| | | | |
|---|---|---|---|
| 2,853,937 | 9/1958 | Peck | 99/404 |
| 3,793,937 | 2/1974 | Lipoma | 99/404 |
| 3,975,275 | 8/1976 | Kato | 210/400 |
| 4,187,771 | 2/1980 | Westover et al. | 99/404 |

Primary Examiner—Ivars C. Cintins
Attorney, Agent, or Firm—J. Gibson Semmes

[57] ABSTRACT

Method and apparatus for draining and expunging excess oil from delicate pizza crusts which have been fried in oil, adapted for association with discharge mechanism of a crust fryer, functioning in cooperation therewith to receive, drain, and manipulatively reposition the crusts for packing into shipping cartons. Crusts discharged from the fryer at the infeed end fall into slots formed by adjacent vertical flights provided at spaced intervals on an inclined drain conveyor. The delicate crusts are held against deformation in upright position by the flights during their traverse of the conveyor length thus allowing for dripping drainage of oil from their respective surfaces. The oil so drained is collected in a drain pan positioned beneath the conveyor and at an angle sloping towards the frying mechanism at the infeed end of the conveyor. Oil collected by the drain pan is thus directed into an associated catch tank for subsequent return to the fryer. At the outfeed end of the drain conveyor, a discharge element receives the drained crusts and redeposits them topping side up, onto a discharge conveyor.

3 Claims, 4 Drawing Figures

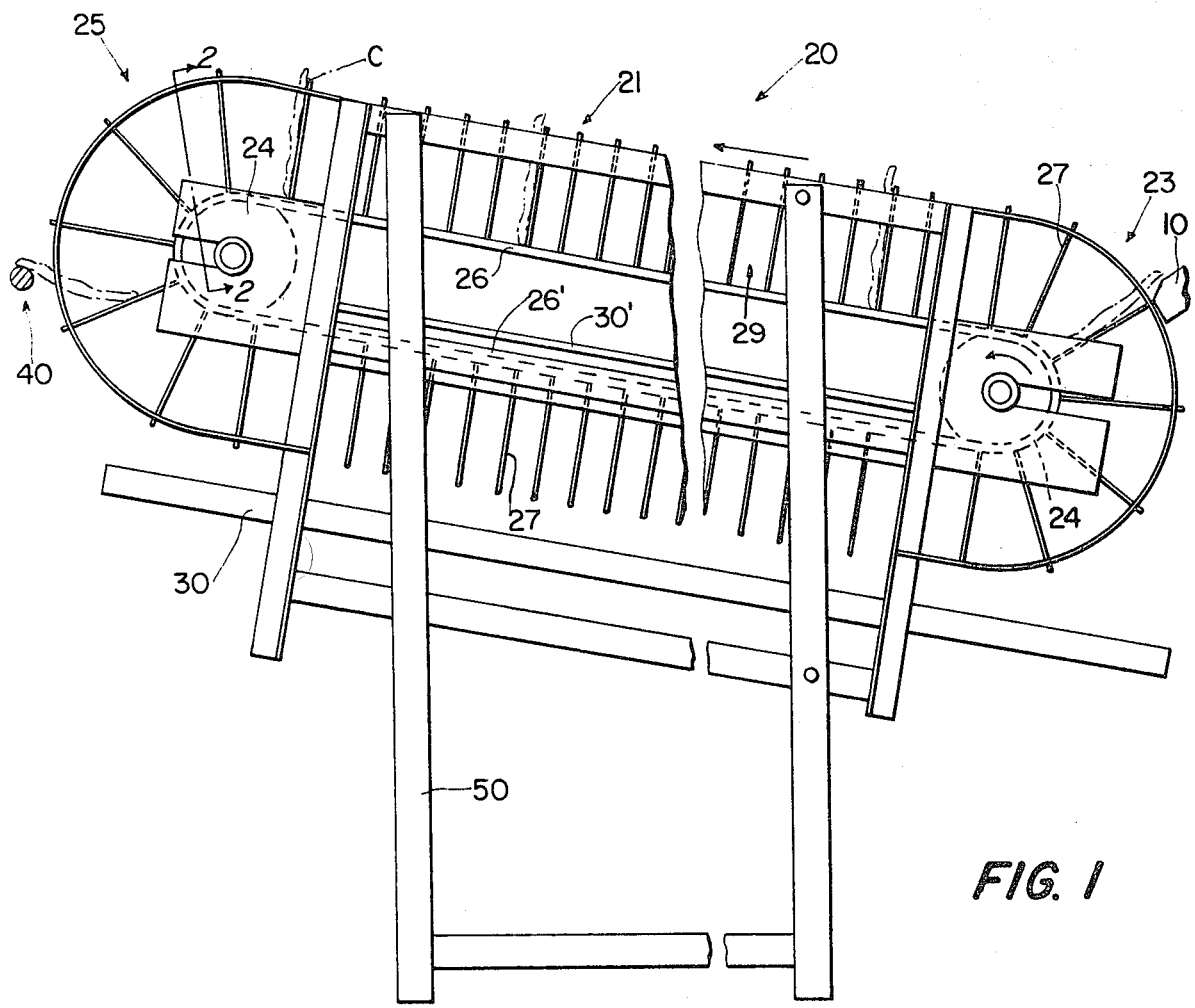
FIG. 1
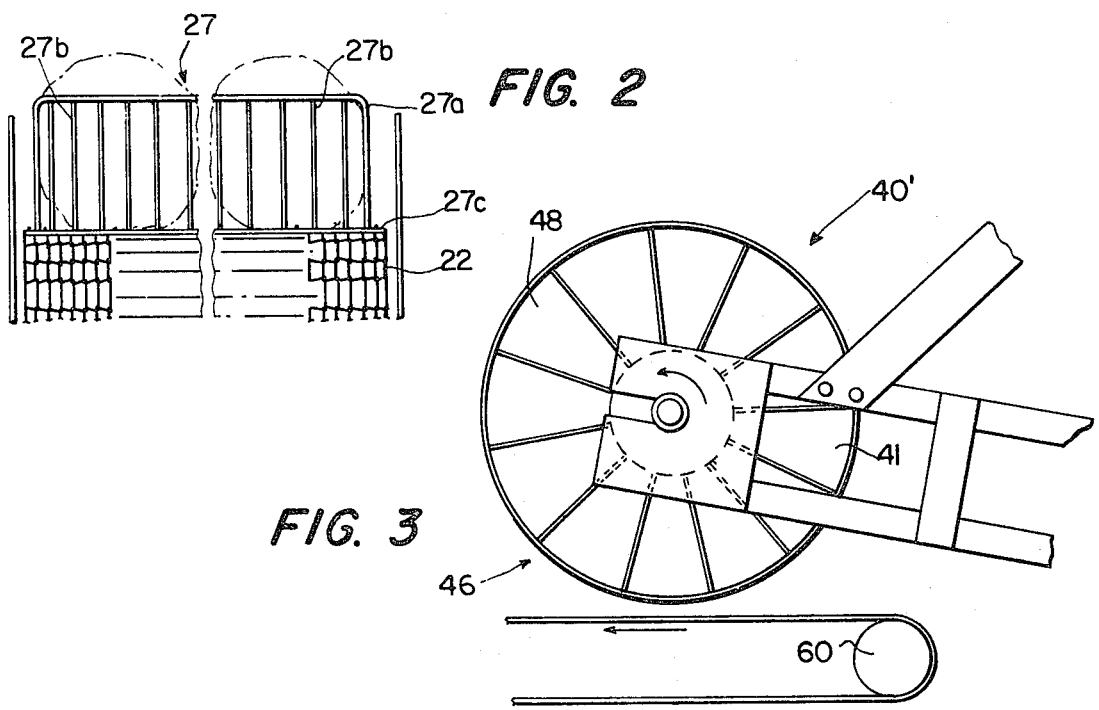
FIG. 2
FIG. 3

APPARATUS FOR THE DRIP DRY CONVEYANCE OF OIL-FRIED DOUGH PRODUCTS

CROSS REFERENCES TO RELATED APPLICATIONS

This application is a Continuation-In-Part of application No. 180,197 filed on Aug. 22, 1980.

BACKGROUND OF THE INVENTION

1. Field of Invention

This invention relates to food processing, and more particularly, to apparatus for surface grease draining and handling of dough products which have been fried in oil.

Systems and apparatus for draining oil from a variety of oil bath fried foodstuffs are known in the patented art, as evidenced, for example, by the U.S. Pat. to Peck, No. 2,853,937, Jimenez, No. 3,766,846, and Buechele et al., No. 2,807,203. The frying apparatus disclosed in the patent to Peck illustrates a grease drainage system which includes an endless foraminous belt through which oil drips into a well for recovery and recirculation. The taco fryer in the patent to Jimenez also calls for an endless conveyor for the drainage of the fried products, upon removal from an oil bath. The fryer of Buechele et al. includes a dripping return chute for recovery and return of the oil to the fat bath.

While drainage systems of these prior fat fryer systems may function satisfactorily for certain products, they are not well suited for the drainage and handling of such comparatively larger fried dough products, as fried pizza crust. These fryer drainage systems are thus inefficient in conveyor handling the delicate crusts after they have been fried and while still very hot and drenched with the cooking oil. For instance, in the commonly assigned U.S. patent application, Ser. No. 127,238, filed Mar. 4, 1980, the oil fried dough product is characterized, in part, by a relatively flat bottom surface and a topping surface marked by randomly oriented domes, separated by low compression areas, the interior of these domes being essentially open cells between top and bottom surfaces. These domes present a crispy exterior which may be easily damaged without proper handling. Since the dome's exterior is the surface which is topped in subsequent operations to produce the final product for marketing, it is desirable that such finished crusts be available, in large quantity, with the upper surfaces properly oriented for pack off. Methods and apparatus heretofore known are incapable of realizing these objectives.

SUMMARY OF THE INVENTION

The present invention provides apparatus for accomplishing the aforementioned handling of oil-fried dough products having the desired configuration of a specific pizza crust. At the same time the invention provides means to effectively and efficiently drain excess oil which adheres to the product crust. The drainage system of the invention includes an endless conveyor and an associated drain means for collecting oil as it drips from the fried crust. An endless inclined conveyor includes a foraminous taut belt to which a plurality of unique vertical flights are attached. At the lower infeed end of the conveyor and at the higher outfeed end thereof, transverse axes are disposed, whereby the flights travel radially thereabout. This arrangement provides mechanism for receiving and transporting upright the individual crusts within slotted compartments formed between adjacent flights. The drip dry conveyor is aligned with the discharge end of an oil bath fryer so that plural crusts are deposited in each of the slotted flight compartments and maintained in a substantially vertical attitude relative to the conveyor belt during traverse of the length of the drip dry conveyor. This vertical orientation enhances gravitational drainage of the oil from the crusts while maintaining the semirigid configuration of the crust. Drainage may be enhanced by suitable air blasts directed downwardly upon the moving crusts. The oil so drained drips into drain means disposed immediately beneath the conveyor. In a preferred form of the invention, the drain means comprises a drain pan and a receptor tank, the drain pan being positioned at an incline to direct the collected oil into the receptor tank for subsequent recirculation into the oil bath frying tank.

After fully traversing the length of the conveyor, the drained crusts may be transferred to an inverter discharge element which functions to position the intended upper surfaces of the crust in predetermined orientation for subsequent handling. In one form, the discharge element comprises a segmented rotary paddle wheel which is driven in cooperative synchronism with the endless drip dry conveyor so that crusts are received by each of the segmented pockets of the paddle wheel and rotated angularly so that, at the point of discharge, the delicate bubbled surfaces of the crusts face upwards. In practice at least the outfeed end of the conveyor and the discharge element include flights upon which rotation from radians which are complemental to each other in transfering crusts from gravity descent.

Alternatively a crust inverter bar may be positioned opposite the outfeed end of the conveyor. The discharging crusts are tripped by the bar to invert the crusts so that the topping side faces upwards. In an alternative embodiment, as the outfeed end of the conveyor turns past the level position the crusts slide out of the compartment bounded by the flights and one side of the conveyor. The periphery of the sliding crusts contacts the inverter bar and the discharging crusts are tripped by the bar to invert the crusts, as above.

BRIEF DESCRIPTION OF THE DRAWINGS

FIG. 1 is a schematic side elevational view of the invention;

FIG. 2 is a view along line 2—2 of FIG. 1, showing orientation of the fried crust;

FIG. 3 is a side elevation of a modified form of the discharge means of the invention;

DESCRIPTION OF THE PREFERRED EMBODIMENTS

Figure 4:
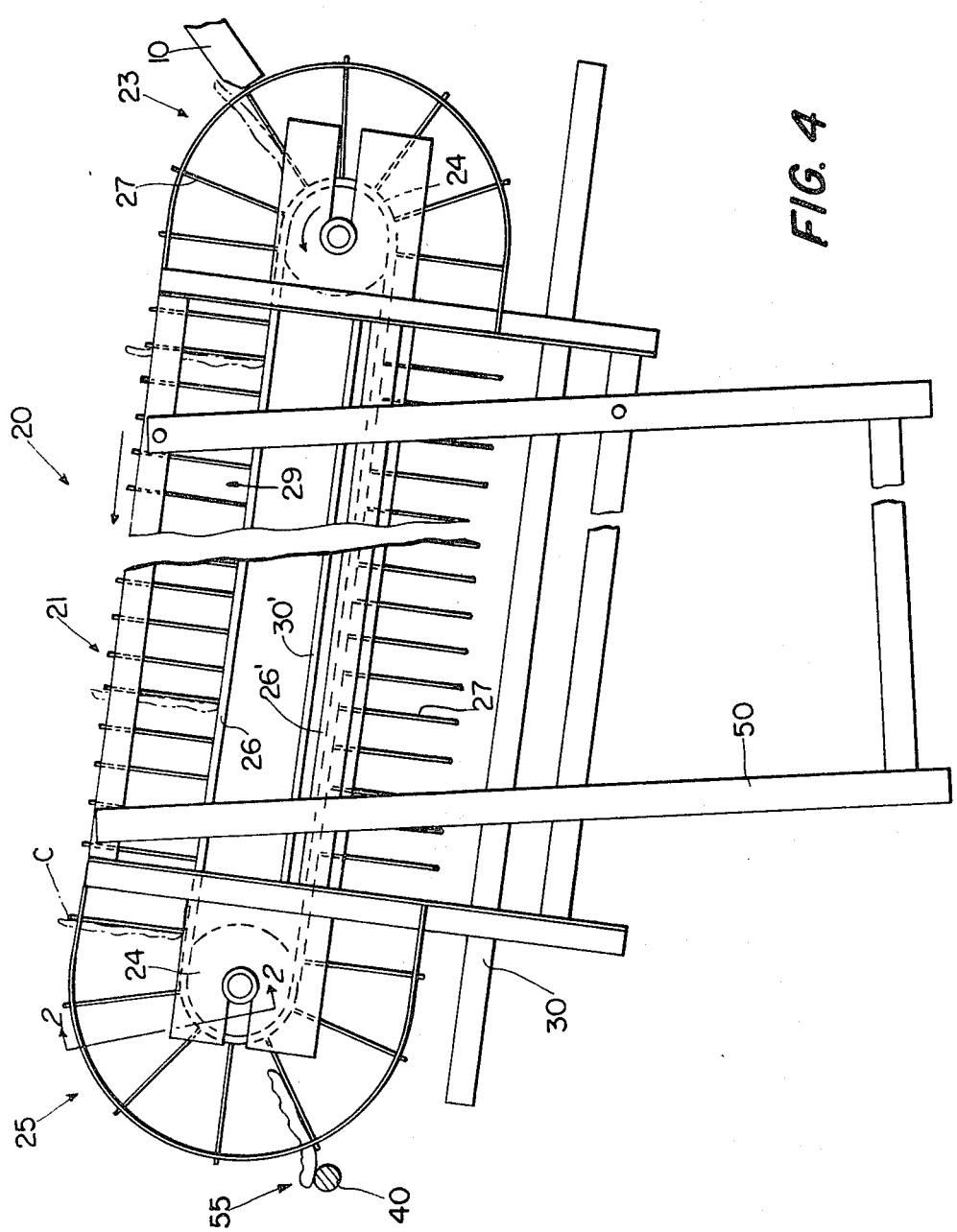
FIG. 4 is a schematic side elevational view of the invention depicting an alternative location of the inverter bar.

Referring to FIG. 1, a schematic representation of the invention as shown associated with the discharge mechanism 10 of a fat fryer. An example of a fat fryer with which the present invention is particularly well adapted for use is that shown in the commonly assigned U.S. patent application, Ser. No. 127,238, mentioned hereinabove. As shown, the invention includes an endless conveyor 20, drain means 30 and 30', and discharge means 40 or 40'. Any suitable means, such as support frame 50, may be utilized to rigidly support these components of the apparatus in proper relationship to each other and in relation to the discharge mechanism 10 of the fat fryer and the pack off transfer conveyor 60, only a portion of which is shown in FIG. 3.

Endless conveyor 20 includes a foraminous belt 22 which is supported by sprockets 24 and upper and lower guide tracks 26 and 26' respectively. The drive mechanism for endless conveyor 20 is not shown. It will be appreciated that any suitable speed selectable means may be utilized. As will hereinafter be more fully explained, endless conveyor 20 is oriented at an incline, increasing in elevation from infeed end, generally designated 23, to outfeed end, generally designated 25.

A plurality of vertical flights 27 are rigidly secured to belt 22 at equal, spaced apart intervals. Each flight 27 is attached in generally perpendicular relationship to the belt 22. That is to say, when the points of attachment of the flights to the belts are oriented in a common plane, each flight forms a right angle with respect to such common plane. As shown in FIG. 1, this arrangement provides a series of slotted compartments formed between adjacent flights. When the conveyor is traversing the upper horizontal or draining run 21 between sprockets 24, the flights are generally parallel, providing uniform and closely spaced apart compartments 29. At the infeed and outfeed ends, 23 and 25, respectively, the flights extend radially outward from the tranverse axes of rotation of sprockets 24. When traversing these segments, the outer ends of the flights fan out to provide enlarged radial disposed openings for receiving the fried crusts at the infeed end 23 and for discharging the drained crust at outfeed end 25.

The construction of flights 27 is shown most clearly in FIG. 2. In preferred form, each flight resembles a grate, including a rigid frame 27a with a plurality of vertically arranged tines 27b attached to the frame and belt bracket 27c. Consistent with the objectives of providing support for the crust during transport and unobstructed drainage of oil therefrom, flights 27 may be configured and constructed in manners other than shown in FIG. 2. But in any event, their vertical height must not be less than ⅔rds to 4/5ths the diameter of a given fried crust; thereby to present inclined positive support to the crusts while drying. In a second embodiment, the height, however, may be greater than the diameter of the pizza crust as explained below.

In operation of the apparatus described so far, oil fried crusts exiting the discharge mechanism 10 of the fat fryer are deposited in each of the slotted compartments at infeed end 23 of conveyor 20. As shown in FIG. 2, the flights 27 and the compartment formed therebetween, are preferrably of sufficient width, relative to a given diameter of the crust, to allow both the deposition of plural crusts within each compartment, and the proper vertical support for each crust so deposited. Characteristically, the fried crusts exiting the fryer are only semirigid. After sufficient cooling, the crusts become rigid and self-supporting. The time necessary for such cooling determines, in part, the overall length of conveyor 20 and the speed with which it is driven. These factors are selected so that the crusts are sufficiently rigidized at outfeed end 25. Relative times of frying to drying may be at 37.0 seconds frying to 46.0 seconds drying and the relative speeds of movement adjusted accordingly, given a fryer of 27 feet in length and a dryer of 6.5 feet in length, axis of input to axis of output. This optimum relates to a crust which has a given diameter of 7.5 inches; whereas for a given crust of 10" the relative times of exposure are 38.0 seconds frying to 38.0 seconds drying and for a given crust of 13.0 inches in diameter, 40.0 seconds frying to 77.0 seconds drying. The length of each flight, end to end, relative to the spaced apart distance between respective flights is determined by a flight length multiple of 4.5–9.0 times the preselected distance between flights as is graphically represented in FIG. 1 of the drawing. The specification, above, points out that the vertical height of the flights must not be less than ⅔rds to 4/5ths the diameter of the crusts, and gives the diameter of the crusts as being 7.5 inches and 10.0 inches, respectively. Reduced to actual dimensions, this means that for a 7.5 inch diameter crust, the flight must be at least 5 to 6 inches high, and for a 10-inch diameter crust, must be at least 6.66 to 8 inches high. In another embodiment, the flights are 9 inches high and spaced 2 inches apart, for both 10 inch crusts and 7.5 inch crusts. Where the crusts are particularly soft due to less cooking time the distance between flights is reduced from 2 inches to 1 inch.

As indicated, to prevent collapse of the semirigid crusts during their initial transport by conveyor 20, the vertical height of the flights 27 is preselected to be substantially similar to a given diameter of the crusts. As will be developed more fully hereinbelow, for operation of the preferred discharge means 40 of the apparatus, the height of the flights 27 must be slightly less than the diameter of the crusts being drip-dried.

In the second embodiment when the crusts undergo less cooking, they become far less rigid than in the first embodiment. In this instance, the spacing between the flights is reduced to 1 inch. This provides increased vertical support for the crust and prevents it from sagging or buckleing into an S-shape between opposing walls of the flights.

As can be seen, the characteristically flat crusts are maintained in a generally positive angular orientation relative to the vertical while being transported through the upper run 21 of the conveyor. This alignment enhances the gravitational drainage of the excess oil which adheres to the crust. The oil so drained drips into drain 30 or 30' which is disposed immediately beneath conveyor 20. In the preferred embodiment of FIG. 1, drain means 30 includes an elongated drain pan which is rigidly secured to support frame 50. Drain pan 30—30' is positioned so that its bottom surface lies in a plane which is generally parallel to the plane which defines the path of belt 22 along the upper run portion 21 of conveyor 20, i.e., the drain pan and conveyor have a common angle of inclination. Drain pan 30' drains to pan 30 thence to a collecting pan. The collected oil together with crumbs and particulate matter which may fall from the crusts are directed by the sloped drain pan 32 into a suitable catch tank. The solid material is therein filtered out before recirculation of the oil into the bath of the fat fryer via suitable means not shown.

As noted hereinabove, the oil fried crusts produced by the method shown in the copending patent application, Ser. No. 127,238, characteristically have a topping surface with prominent, randomly oriented domes which are separated by low compression areas. When finally cooked, as, for instance, at discharge end 25 of the present apparatus, these domes have a crisp exterior which is easily damaged. For subsequent handling of the crusts, i.e., packaging for shipment, it is desirable that these delicate topping surfaces be uniformly positioned upwards. As can be seen with reference to FIG. 1, the crusts which are discharged from the fat fryer and deposited into compartments, are transported the length of upper run 21 with the topping surfaces facing in the direction of travel. This is indicated in FIG. 1 by the arrow associated with the crusts labeled C. To achieve the proper positioning of the crust on packoff conveyor 60, discharge means 40 is provided, the preferred form being that shown in FIG. 1. In this embodiment, discharge means 40 includes inverter bar which is positioned adjacent discharge end 25 of the conveyor and supported by appropriate means. In the preferred embodiment, inverter bar 40 extends tranverse to conveyor 20 and proximal thereto so as to contact the exposed portions of the drained crust as they are swept thereagainst by movement of the conveyor. As schematically depicted with broken line in FIG. 1, the discharging crusts engage and pivot about inverter bar. This allows the crusts to fall freely from the expanded compartment onto a fixed chute and thence onto pack-off conveyor 60. It will be appreciated that factors such as speed of the conveyor and relative dimensions of the discharge apparatus must be selected so that the inversion discharge step is accomplished without damage to the crust.

In a second embodiment as shown in FIG. 4, indicated generally by 55, the inverter bar 40 is located beneath the center axis of the discharge end of the conveyor. As flights 27 rotate about the sprocket 24 the flights pass the horizontal and slope downward. The downward slope of the flight causes the pizza crust, now resting on the flight, to slide to the exterior thereof where upon the outermost edge of the crust contacts inverter bar 40 and the crust is flipped topside up as hereinbefore described.

An alternative embodiment of the discharge means is shown in FIG. 3. In this form of the invention a segmented rotary paddle wheel 46 is utilized. This paddle wheel is supported and positioned adjacent outfeed end 25 of the conveyor by auxiliary frame member 41 which is rigidly secured to the main support frame 50. Appropriate drive means (not shown) rotate paddle wheel 46 in cooperative synchronism with endless conveyor 20 so that the crusts are cyclically transferred from the compartments 29 into the receptacles 48. Rotation of the paddle wheel produces an effective inversion which results in discharge of the crusts onto conveyor 60 with the delicate bubbled surfaces thereof facing upwards.

We claim:
1. Apparatus for draining excess oil from hot, drenched, oil-fried dough crust of the type having an upper surface to be topped, comprising:
  (A) an inclined, endless conveyor having
    A 1 an infeed and,
    A 2 an outfeed end, the infeed end being lower than the outfeed end, said conveyor comprising,
    A 3 a foraminous belt bearing a plurality of vertical flights, each flight comprising a grate which is defined by vertically disposed spaced apart tines, said tines being connected top and bottom by a rigid frame, said flights and frame being secured to said belt at closely spaced apart intervals wherein the length of each flight, end to end, relative to the spaced apart distance between respective flights, is determined by a flight length multiple of 4.5–9.0 times the preselected distance between adjacent flights, adjacent flights defining slotted compartments for receiving and conveying oil-fried crust at a positive angle relative to the horizontal;
  (B) at least one drain disposed beneath said conveyor for collecting oil dripped from said crust; said drain pan having an inclination which is common to the angle of inclination of the conveyor;
  (C) inverter discharge means for engaging drained crust upon outfeed from said conveyor, disposed in extension of the conveyor, said discharge means positioning the upper surface of the crust in predetermined adjusted orientation, relative to the horizontal for subsequent handling and pack off.

2. The apparatus of claim 1, wherein said discharge means comprises a fixed inverter bar which is disposed in crust flip flop relationship to the outfeed end of the conveyor.

3. The apparatus of claim 1, wherein said discharge means comprises a segmented, rotary paddlewheel, said paddlewheel having flights corresponding in construction to the flights of the conveyor and synchronizing means for driving said conveyor and said rotary paddlewheel in cooperative synchronous movement.

* * * * *